(12) United States Patent  
Millsap et al.

(10) Patent No.: US 9,022,713 B2  
(45) Date of Patent: May 5, 2015

(54) ROTATABLE AND TILTABLE RECEIVING TABLE FOR A MID-SIZE OR BIG BALE STACK WAGON

(71) Applicants: Leland K. Millsap, Fruitland, ID (US); Randall R. Clagg, Payette, ID (US)

(72) Inventors: Leland K. Millsap, Fruitland, ID (US); Randall R. Clagg, Payette, ID (US)

(73) Assignee: Mil-Stak Inc., Fruit Land, ID (US)

( * ) Notice: Subject to any disclaimer, the term of this patent is extended or adjusted under 35 U.S.C. 154(b) by 72 days.

(21) Appl. No.: 13/631,552

(22) Filed: Sep. 28, 2012

(65) Prior Publication Data

US 2013/0078074 A1     Mar. 28, 2013

Related U.S. Application Data

(60) Provisional application No. 61/540,520, filed on Sep. 28, 2011.

(51) Int. Cl.
```
A01D 90/08    (2006.01)
A01F 25/14    (2006.01)
A01D 90/00    (2006.01)
A01D 85/00    (2006.01)
```

(52) U.S. Cl.
CPC .............. *A01D 85/005* (2013.01); *A01F 25/14* (2013.01); *A01D 90/083* (2013.01); *A01D 2085/007* (2013.01)

(58) Field of Classification Search
CPC ..... A01D 90/08; A01D 85/005; A01D 87/12; A01D 2085/007; A01D 87/122; A01D 90/00; B60P 1/483; B60P 1/00; Y10S 414/112; B62D 21/14
USPC ............... 254/8 C; 298/11, 14; 414/111, 132, 414/24.5, 24.6, 25, 347, 491, 492, 501, 503, 414/551, 754, 758, 759, 778, 779, 780, 781, 414/782, 794, 789.2, 789.3, 789.7, 919, 414/922; 52/119
See application file for complete search history.

(56) References Cited

U.S. PATENT DOCUMENTS

| | | | | |
|---|---|---|---|---|
| 1,152,510 | A | * | 9/1915 | Hunt ................................ 298/14 |
| 2,848,196 | A | * | 8/1958 | Simmonds ....................... 175/52 |
| 2,884,242 | A | * | 4/1959 | Fleming ............................ 269/61 |
| 2,928,558 | A | * | 3/1960 | Bamford et al. ............... 414/680 |

(Continued)

FOREIGN PATENT DOCUMENTS

GB         2307675 A  *  6/1997  ............. A01D 90/02

*Primary Examiner* — Gregory Adams  
(74) *Attorney, Agent, or Firm* — Charles R. Clark

(57) ABSTRACT

An improved rearward-hinged and forward-hinged, rotatable and tiltable receiving table for a agricultural bale transport vehicle that selectively tilts and rotates a layer of bales resting thereupon 90 degrees relative to a preceding bale layer on the transport vehicle to criss-cross tie a load of bales (a plurality of layers of bales) together in a load stack offloaded from the transport vehicle to the field for later pickup and movement or deposit in a bale storage area. Preferably, the bale transport vehicle is a mid-size or big bale stack wagon having a Mil-Stak® bale loader previously installed or concurrently being installed. The invention enables the lifting, tilting, rotating, and depositing of one mid-size or big bale or a plurality of mid-size or big bales from a rearward-hinged and forward-hinged bale receiving table of the bale transport vehicle onto a rear-hinged stack load table for consolation into a load with other layers of bales for transport from the field. The invention allows selective 90 degree rotation of a layer of bales relative to a preceding layer of bales of the bale stack on the rear-hinged stack load table.

5 Claims, 12 Drawing Sheets

(56) References Cited

U.S. PATENT DOCUMENTS

| | | | |
|---|---|---|---|
| 3,002,326 A * | 10/1961 | Carter et al. | 53/574 |
| 3,476,267 A * | 11/1969 | Clarke | 414/779 |
| 3,478,898 A * | 11/1969 | Kenna, Jr. et al. | 414/789.1 |
| 3,811,584 A * | 5/1974 | Grey et al. | 414/801 |
| 4,119,218 A * | 10/1978 | Guenon et al. | 414/789.3 |
| 4,190,391 A * | 2/1980 | Sesser et al. | 414/789.3 |
| 5,664,933 A * | 9/1997 | Scherer et al. | 414/743 |
| 5,697,758 A * | 12/1997 | Tilley | 414/802 |
| 6,171,046 B1 * | 1/2001 | Nutcher | 414/24.5 |

* cited by examiner

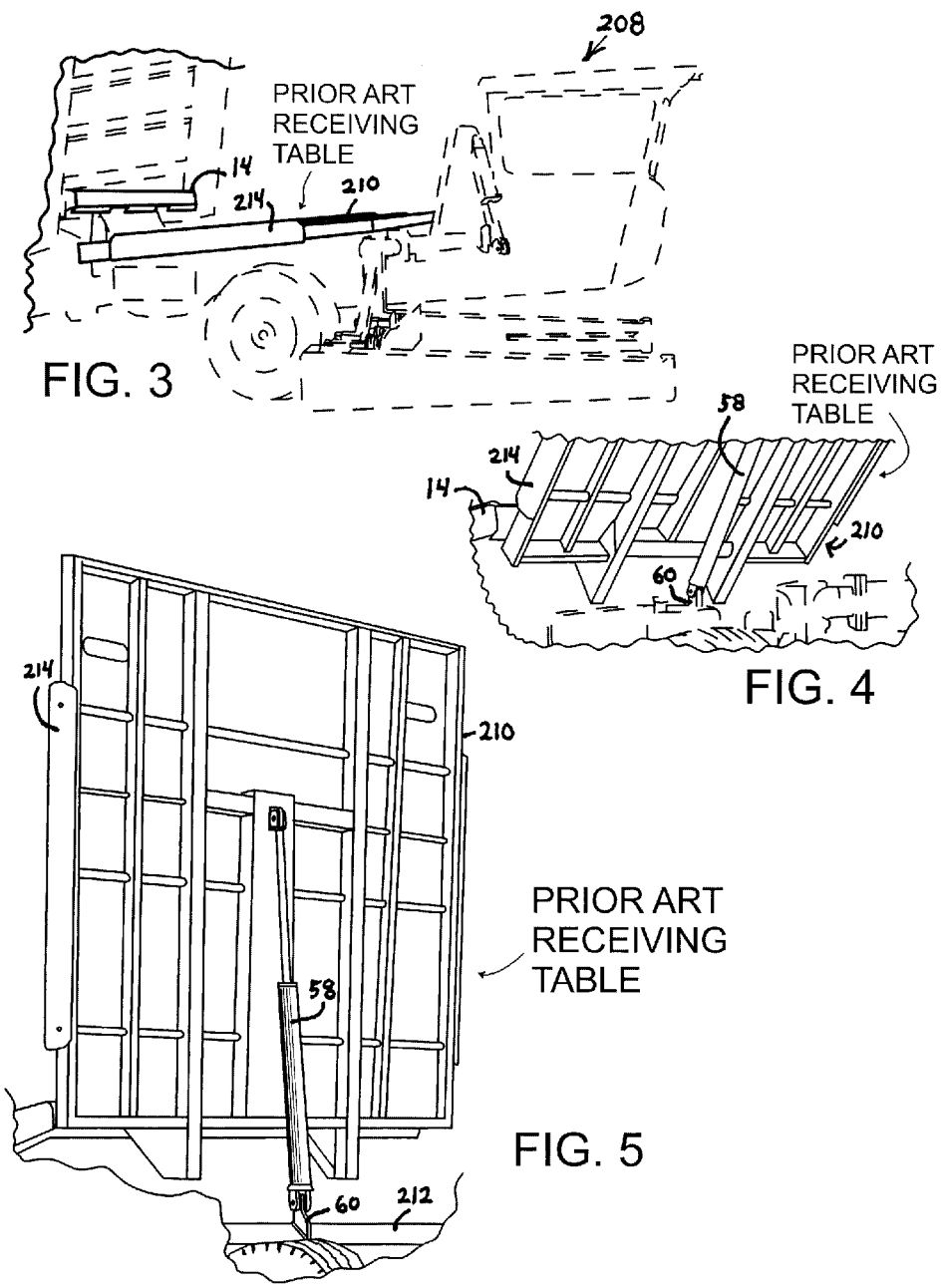

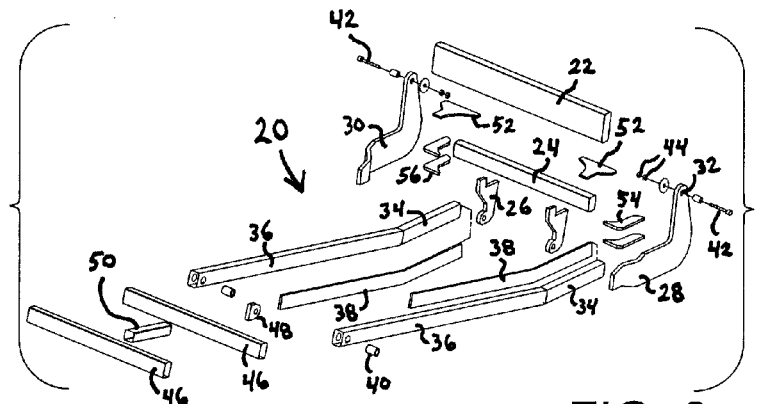
FIG. 8
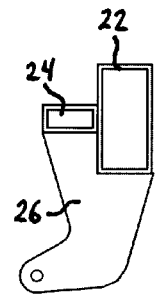
FIG. 9
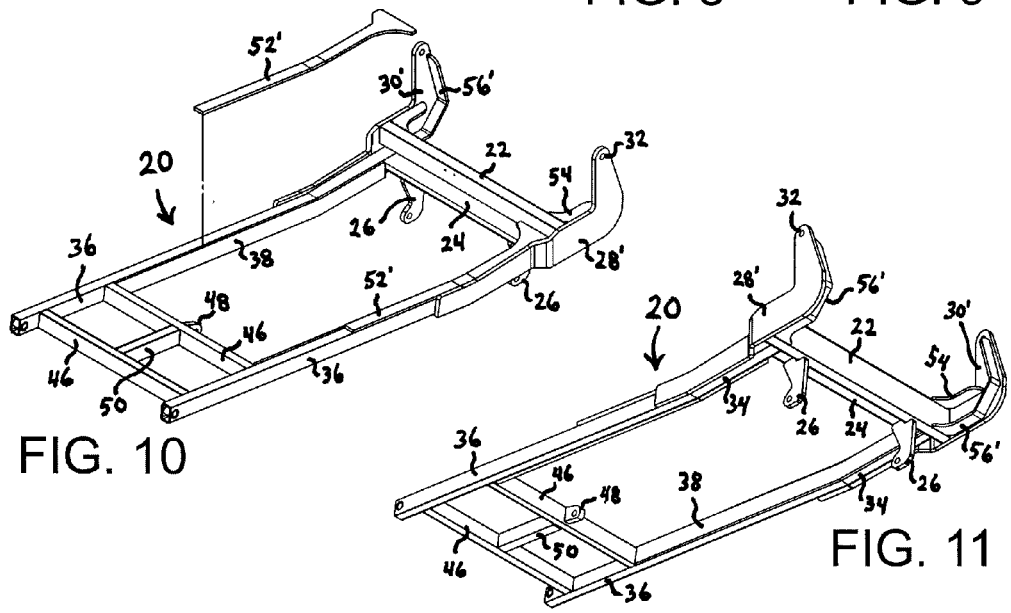
FIG. 10
FIG. 11
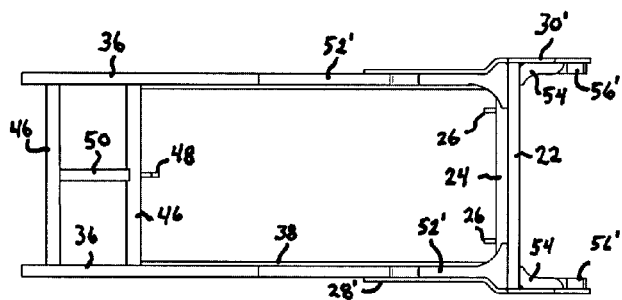
FIG. 12

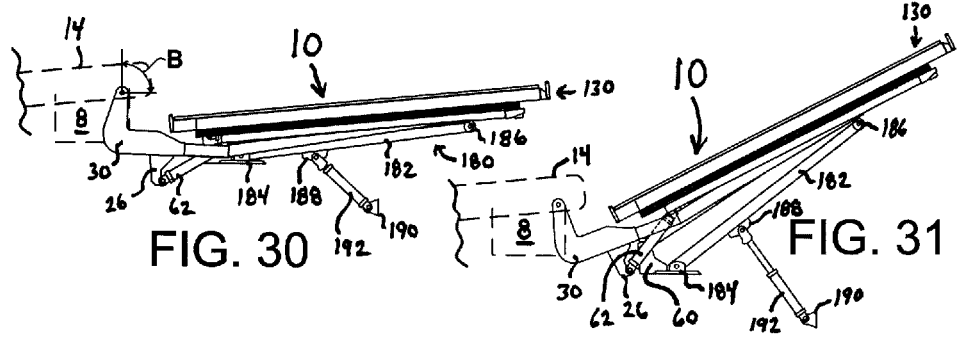
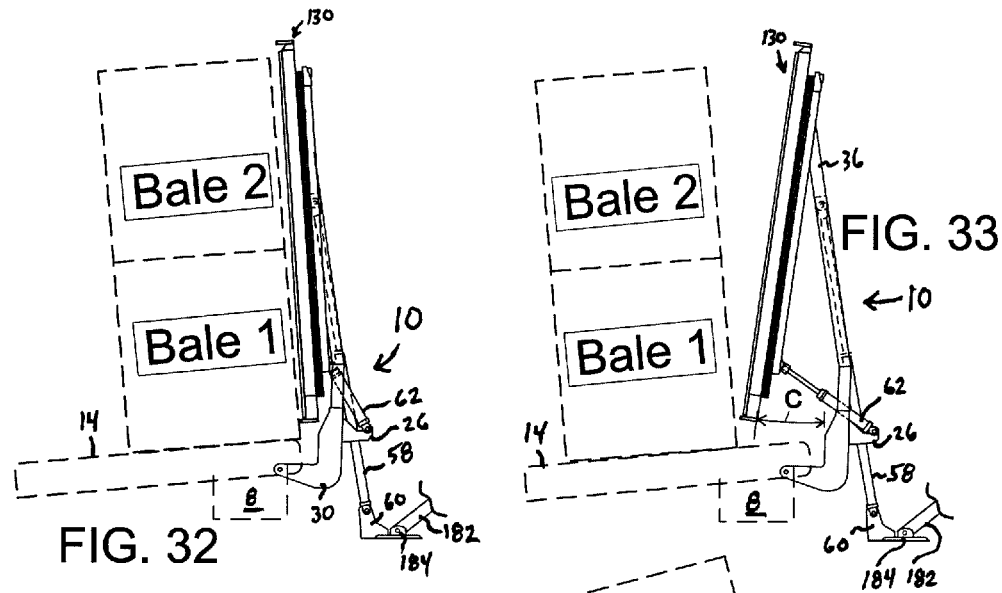
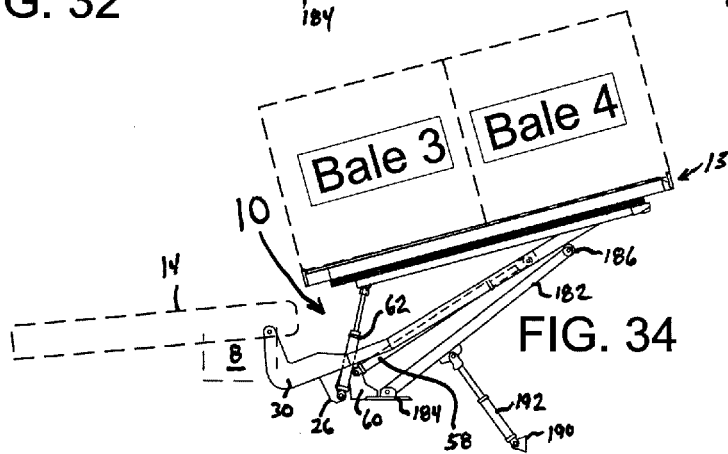

ROTATABLE AND TILTABLE RECEIVING TABLE FOR A MID-SIZE OR BIG BALE STACK WAGON

CROSS-REFERENCE TO RELATED APPLICATIONS

This application claims the benefit of U.S. Provisional Application No. 61/540,520, filed Sep. 28, 2011.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Field of the Invention

The present invention relates to replacing a preexisting non-rotatable non-tiltable receiving table of a bale transport vehicle with an improved rearward-hinged and forward-hinged, rotatable and tiltable receiving table that selectively tilts and rotates a layer of bales resting thereupon 90 degrees relative to a preceding bale layer on the transport vehicle to criss-cross tie a load of bales together in an agricultural setting. Preferably, the bale transport vehicle is a mid-size or big bale stack wagon having a Mil-Stak® bale loader previously installed or concurrently being installed.

The invention enables the lifting, tilting, rotating, and depositing of one mid-size or big bale or a plurality of mid-size or big bales from a rearward-hinged and forward-hinged bale receiving table of the bale transport vehicle onto a rear-hinged stack load table for consolation into a load with other layers of bales for transport from the field. The invention allows selective 90 degree rotation of a layer of bales relative to a preceding layer of bales of the bale stack on the rear-hinged stack load table.

The invention can serve as a useful modification to an existing bale transport vehicle such as a bale stack wagon from a series of New Holland™ bale wagons and other vehicles that incorporate a rearward-hinged, non-rotating, non-tilting bale receiving table proximally forward of a rear-hinged stack load table. The invention answers the question: how to get one rectangular receiving table holding large rectangular bales to rotate about a generally vertical axis in close proximity to a rectangular stack load table? The present invention solves the problem by selectively raising the receiving table 10 upward about a rearward lower pivot frame assembly 20 pivot axis and tilting the receiving table upward about a forward lower pivot frame assembly pivot axis (defined by pivot sleeves 40) to allow a corner portion of the receiving table to swing over proximate vertically overlapping portions of the rectangular stack load table 14, see FIGS. 28 and 35.

The invention in its preferred embodiment allows the quick and easy conversion of the bale wagon from a non-rotating, non-tilting receiving table bale transport vehicle to a rearward-hinged and forward-hinged, rotatable and tiltable receiving table bale transport vehicle. The invention also allows quick and easy conversion back to a non-rotating, non-tilting receiving table bale transport vehicle from a rotatable and tiltable receiving table bale transport vehicle. The invention can also be incorporated into an original equipment manufactured (OEM) bale transport vehicle.

The present invention permits a novel lifting, selective tilting, selective rotating, and depositing of a layer of bales from a rearward-hinged and forward-hinged, rotatable and tiltable receiving table onto a proximate rear-hinged stack load table of a bale transport vehicle.

BRIEF SUMMARY OF THE INVENTION

A principal objective of this invention is to provide a novel and improved rearward-hinged and forward-hinged, rotatable and tiltable receiving table for a mid-size or big bale stack wagon that is lightweight, compact, simple, low-maintenance, and reliable for use in a system that permits a farmer or other user to reversibly modify an existing non-rotating, non-tilting receiving table bale transport vehicle into a more efficient agricultural tool having a rearward-hinged and forward-hinged, rotatable and tiltable receiving table.

In the preferred embodiment, the invention is easily attached to a bale transport vehicle such as a New Holland™ bale wagon by removal of an original rearward-hinged, non-rotatable and non-tiltable receiving table and replacement with a rearward-hinged and forward-hinged, rotatable and tiltable receiving table attached to the bale transport vehicle by a plurality of conventional pins and clips or a plurality of bolts and nuts, and by easy connection of a plurality of hydraulic lines of a plurality of hydraulic actuators of the invention to a hydraulic system of the pre-existing bale transport vehicle.

A further object of this invention involves a method of converting a bale stack wagon such as many of the bale wagons manufactured by New Holland North America, Inc. (New Holland) that cannot rotate a bale layer relative to an adjacent bale layer to criss-cross tie bale load layers together into a vehicle capable of selectively rotating a bale layer 90 degrees relative to a preceding bale layer to criss-cross tie a load of mid-size or big bales into a more cohesive and stable stack load of bales.

The rearward-hinged and forward-hinged, rotatable and tiltable receiving table in the preferred embodiment relevant to a modification of a preexisting bale transport vehicle having a rearward-hinged non-rotating, non-tilting receiving table having a table lifting actuator having two hydraulic lines comprises the table lifting actuator and five additional hydraulic actuators and ten additional quick connect hydraulic lines as each actuator generally requires the hook up of two hydraulic lines. The ten additional hydraulic lines selectively can be powered by a hydraulic system on a preexisting New Holland™ bale wagon by a person reasonably skilled in the hydraulic power art.

The control of the invention's actuators may be accomplished by selective manual controls or by utilization of a system of custom software control with a suitable controlling system or by a software modification of the New Holland™ hydraulic system to control the additional actuators.

The present invention primarily uses simple nuts and bolts and quick connect hydraulic lines to facilitate easy and reversible conversion of a preexisting bale stack wagon from a rearward-hinged, non-rotating, non-tilting receiving table bale transport wagon to a mid-size and big bale rearward-hinged and forward-hinged, rotatable and tiltable receiving table bale transport wagon and back to a rearward-hinged, non-rotating, non-tilting receiving table bale transport wagon. After the modification as taught herein, subsequent conversion to or from one configuration to the other can be rapidly and easily accomplished.

The rearward-hinged and forward-hinged, rotatable and tiltable receiving table in its preferred embodiment is mounted to and from a preexisting bale transport vehicle having a rearward-hinged bale receiving table replacing the preexisting receiving table.

Preferably, when a New Holland™ bale wagon already having a Mil-Stak® bale loader is modified to include the present invention, the bale wagon's preexisting rearward-hinged, non-rotating, non-tilting receiving table is unmounted from the vehicle's two main receiving table mounts by removal of two main pivot bolts and associated pairs of jam nuts and the instant invention a rearward-hinged and forward-hinged, rotatable and tiltable receiving table is mounted to the vehicle using said two main receiving table mounts, said two main pivot bolts, and said jam nuts.

Preferably, the replacing rearward-hinged and forward-hinged, rotatable and tiltable receiving table utilizes the same table lifting actuator previously used with the replaced table.

Preferably a table booster strut (a class three lever) powered by a hydraulic booster strut actuator is pivotally attached to and between appropriate actuator mounts and actuator ears attached to the strut and to the vehicle frame preferably using bored holes in the frame and cooperating nuts and bolts and pins and retaining clips.

The preferred embodiment uses hydraulic actuators, but other comparable devices including pneumatic actuators could be used.

Additional and various other objects and advantages attained by the invention will become more apparent as the specification is read and the accompanying figures are reviewed.

BRIEF DESCRIPTION OF THE SEVERAL VIEWS OF THE DRAWING

FIG. 3 is a partial, perspective view of a prior art rearward-hinged, non-rotatable and non-tiltable receiving table 210 in a lowered parked position and attached to a bale transport vehicle 208 having a rear-hinged stack load table 14;

FIG. 4 is a partial, perspective view of a prior art rearward-hinged, non-rotatable and non-tiltable receiving table 210 having a prior art bale side stop 214 in a partially elevated position by a table lifting actuator 58 attached to a table lifting actuator lower mounting ear 60 of the bale transport vehicle 208;

FIG. 5 is a partial, perspective view of the prior art rearward-hinged, non-rotatable and non-tiltable receiving table 210 shown in FIG. 4 in a fully elevated position elevated approximately 90 degrees upward by the table lifting actuator 58 attached to and between a centrally located actuator ear on the lower surface of the table and the table lifting actuator lower mounting ear 60 of the bale transport vehicle 208;

FIG. 8 is a perspective, exploded view from the left front quarter from above of a lower pivot frame assembly 20 of the rearward-hinged and forward-hinged, rotatable and tiltable receiving table 10;

FIG. 9 is a cross-sectional view showing the attachment relationships between a main cross rail 22, a cross tilt tube rail 24, and a lower table tilt actuator mounting ear 26;

FIG. 10 is a perspective, partially exploded view from the left front quarter from above of a lower pivot frame assembly 20 shown in FIG. 8 showing two alternative tube to plate T-gussets 52';

FIG. 11 is a perspective view from the left rear quarter from below of the lower pivot frame assembly shown in FIG. 10;

FIG. 12 is a top plan view of the lower pivot frame assembly 20 shown in FIGS. 10 and 11;

FIG. 30 is a side plan view of the rearward-hinged and forward-hinged, rotatable and tiltable receiving table 10 in a lowered unrotated untilted parked position and attached to a transport vehicle 8 and showing the upper rotating table frame assembly 130 oriented fore and aft and rotatably attached to the intermediate tilting table frame assembly 70 and the intermediate tilting table frame assembly pivotally attached to the lower pivot frame assembly 20 and showing an arc of elevation B of the entire rearward-hinged and forward-hinged rotatable and tiltable receiving table of approximately 90 degrees from the parked position to a fully elevated position;

FIG. 31 is a side plan view of the rearward-hinged and forward-hinged, rotatable and tiltable receiving table 10 in a partially elevated untilted position and attached to a transport vehicle 8 and showing the upper rotating table frame assembly 130 oriented fore and aft and rotatably attached to the intermediate tilting table frame assembly 70 and the intermediate tilting table frame assembly pivotally attached to the lower pivot frame assembly 20;

FIG. 32 is a side plan view of the rearward-hinged and forward-hinged, rotatable and tiltable receiving table 10 in a fully elevated untilted position and pivotally attached to a transport vehicle 8 and showing the upper rotating table frame assembly 130 oriented fore and aft and rotatably attached to the intermediate tilting table frame assembly 70 and the intermediate tilting table frame assembly pivotally attached to the lower pivot frame assembly 20 and showing a bale layer of phantom Bale 1 and Bale 2 after their deposit on the stack load table 14 by the receiving table;

FIG. 33 is a side plan view of the rearward-hinged and forward-hinged, rotatable and tiltable receiving table 10 in a fully elevated and fully tilted position and pivotally attached to a transport vehicle 8 and showing the upper rotating table frame assembly 130 oriented fore and aft and rotatably attached to the intermediate tilting table frame assembly 70 and the intermediate tilting table frame assembly pivotally attached to the lower pivot frame assembly 20 and showing an indicated arc C of tilting of the intermediate tilting table frame assembly from the lower pivot frame assembly of approximately 20 degrees from the untilted position to a fully tilted position and showing the bale layer of phantom Bale 1 and Bale 2 after their deposit on and a lateral shift of their position along the stack load table 14 by the upper rotating table frame assembly;

FIG. 34 is a side plan view of the rearward-hinged and forward-hinged, rotatable and tiltable receiving table 10 in a partially elevated tilted position and pivotally attached to a transport vehicle 8 and showing the upper rotating table frame assembly 130 oriented fore and aft and rotatably attached to the intermediate tilting table frame assembly 70 and the intermediate tilting table frame assembly pivotally attached to the lower pivot frame assembly 20 and showing the bale layer of phantom Bale 3 and Bale 4 after their deposit on the receiving table;

DETAILED DESCRIPTION OF THE INVENTION

Figure 1:
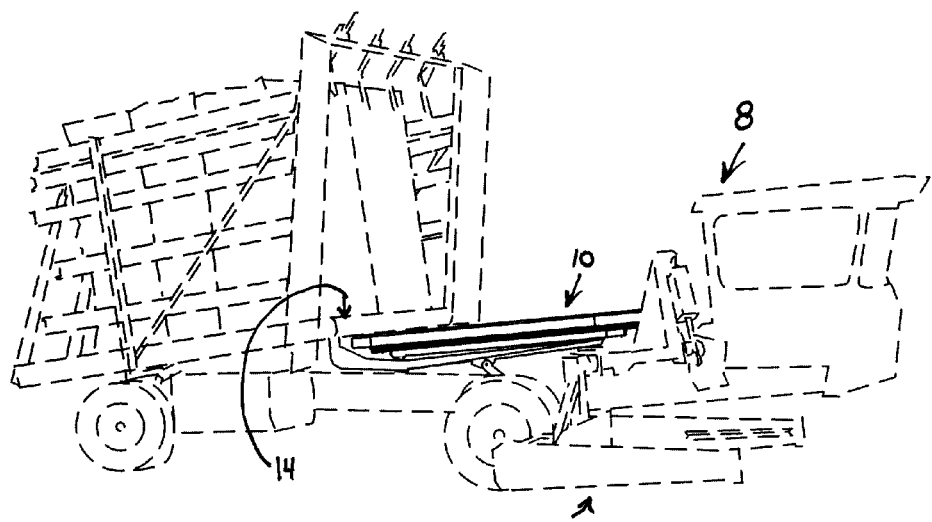
FIG. 1 is a perspective view of a rearward-hinged and forward-hinged, rotatable and tiltable receiving table 10 in a lowered untilted unrotated parked position and attached to a bale transport vehicle 8 having a rear-hinged stack load table 14.
Figure 2:
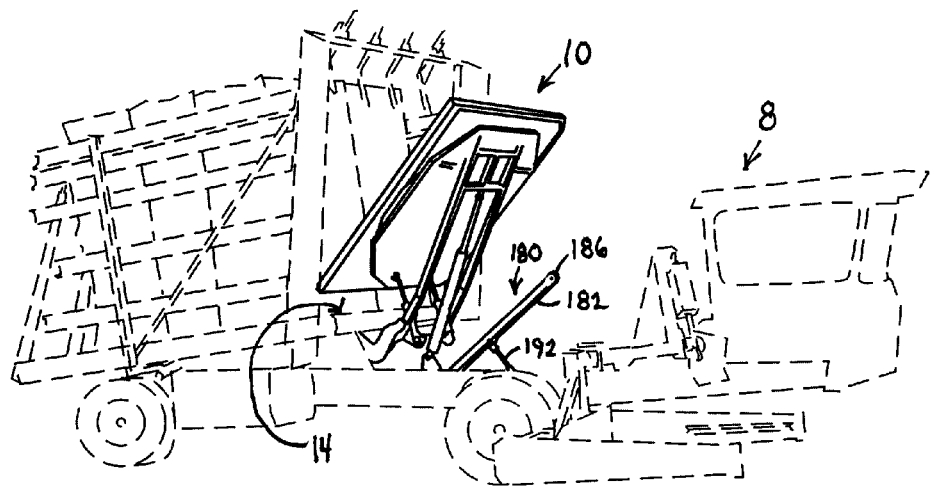
FIG. 2 is a perspective view of the rearward-hinged and forward-hinged, rotatable and tiltable receiving table 10 in a position 90 degree rotated about a rotation axis perpendicular to both the longitudinal axis and the latitudinal axis of the receiving table, partially elevated, and fully tilted position and attached to a transport vehicle 8 having a rear-hinged stack load table 14 and showing a booster strut 182 fully elevated.
Figure 6:
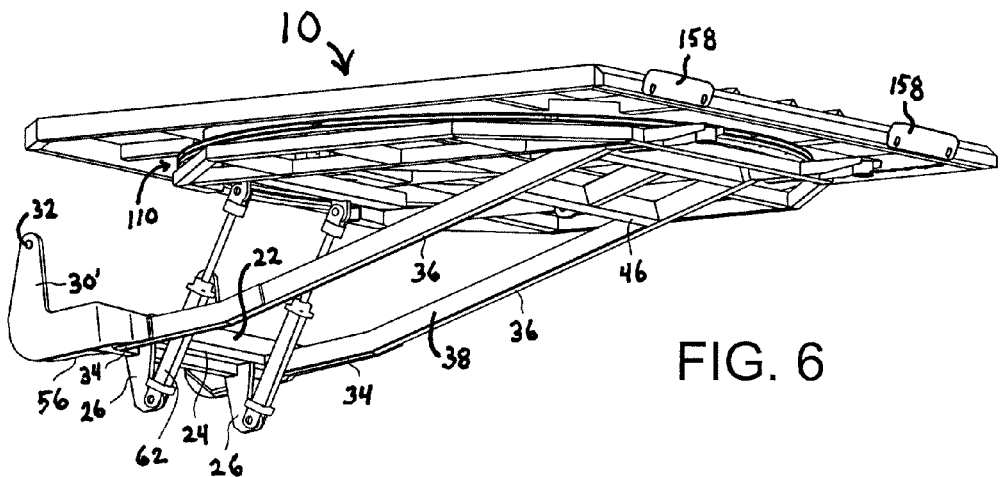
FIG. 6 is a perspective view from slightly below the right front quarter of a rearward-hinged and forward-hinged, rotatable and tiltable receiving table 10 (a table lifting actuator 58, a table lifting actuator lower mounting ear 60, a table booster strut 182, a table booster strut actuator 192, a booster strut mount 184, and two booster strut actuator mounting ears 188 and 190 are not shown)
Figure 7:
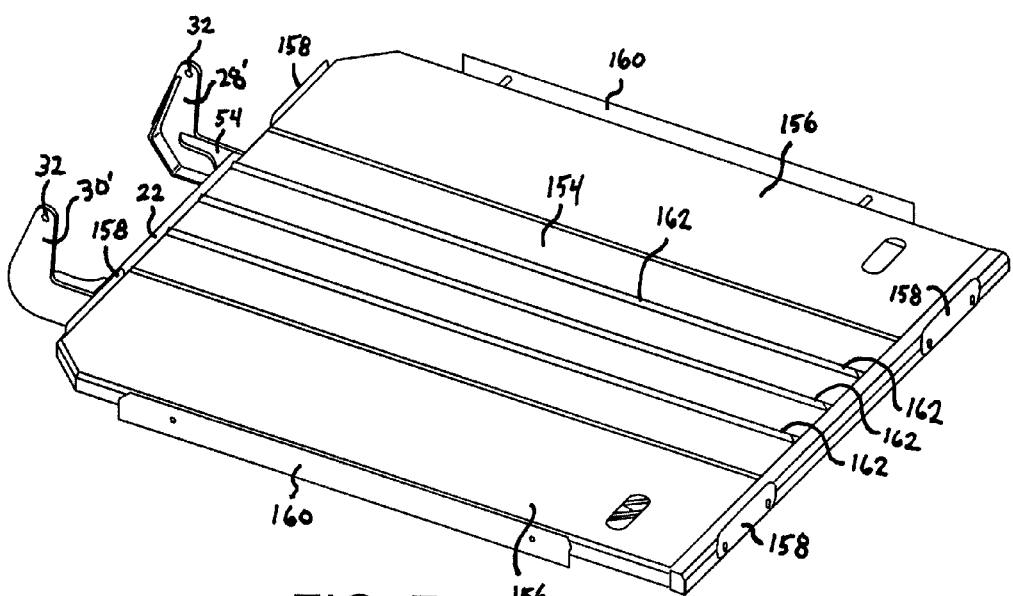
FIG. 7 is a perspective view from slightly above the right front quarter of the rearward-hinged and forward-hinged, rotatable and tiltable receiving table shown in FIGS. 1, 2, and 6.
Figure 13:
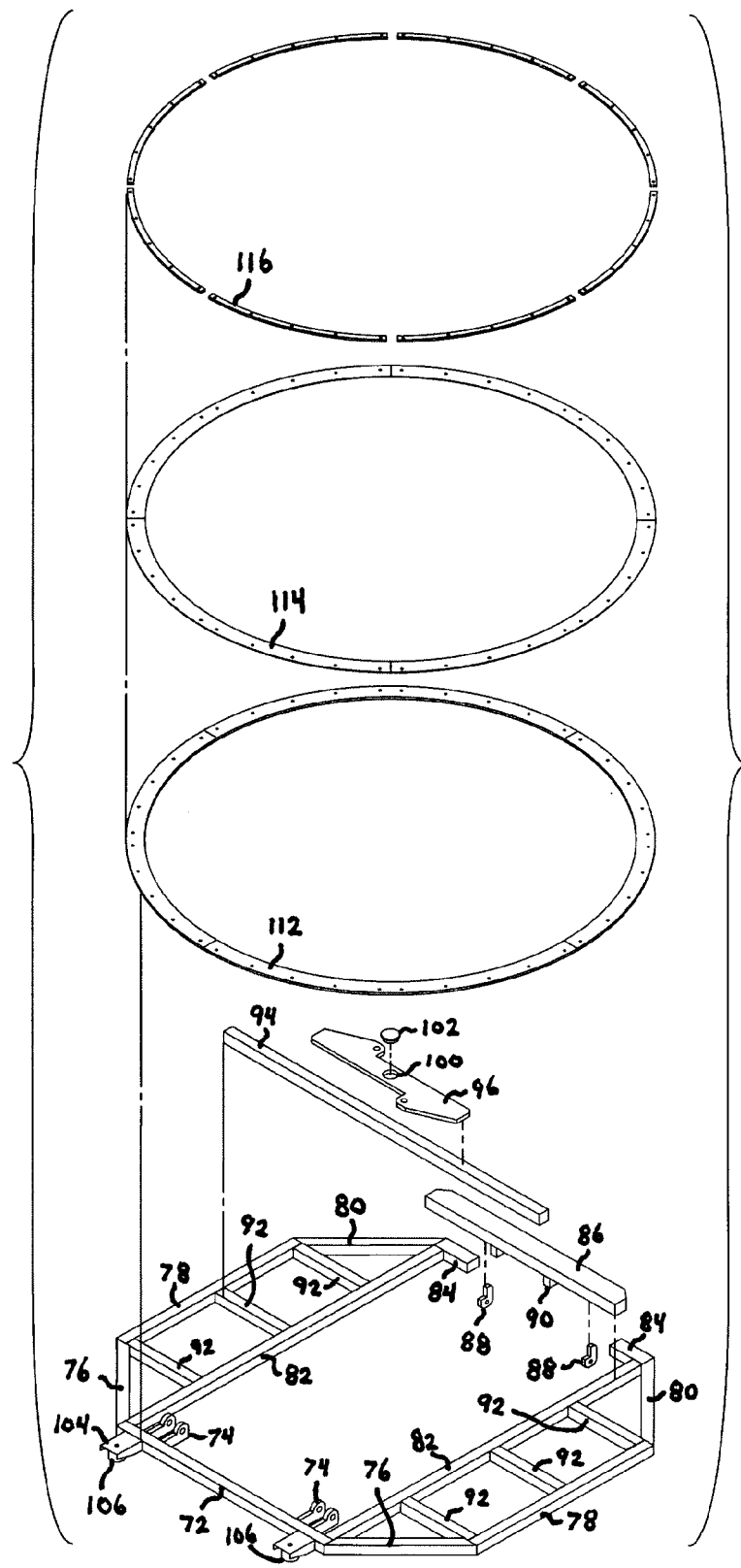
FIG. 13 is a perspective, partially exploded view of an intermediate tilting table frame assembly 70 of the preferred embodiment (a segmented capture ring 118 an element of a fixed ring assembly 110 is not shown; see FIGS. 21 to 27)
Figure 14:
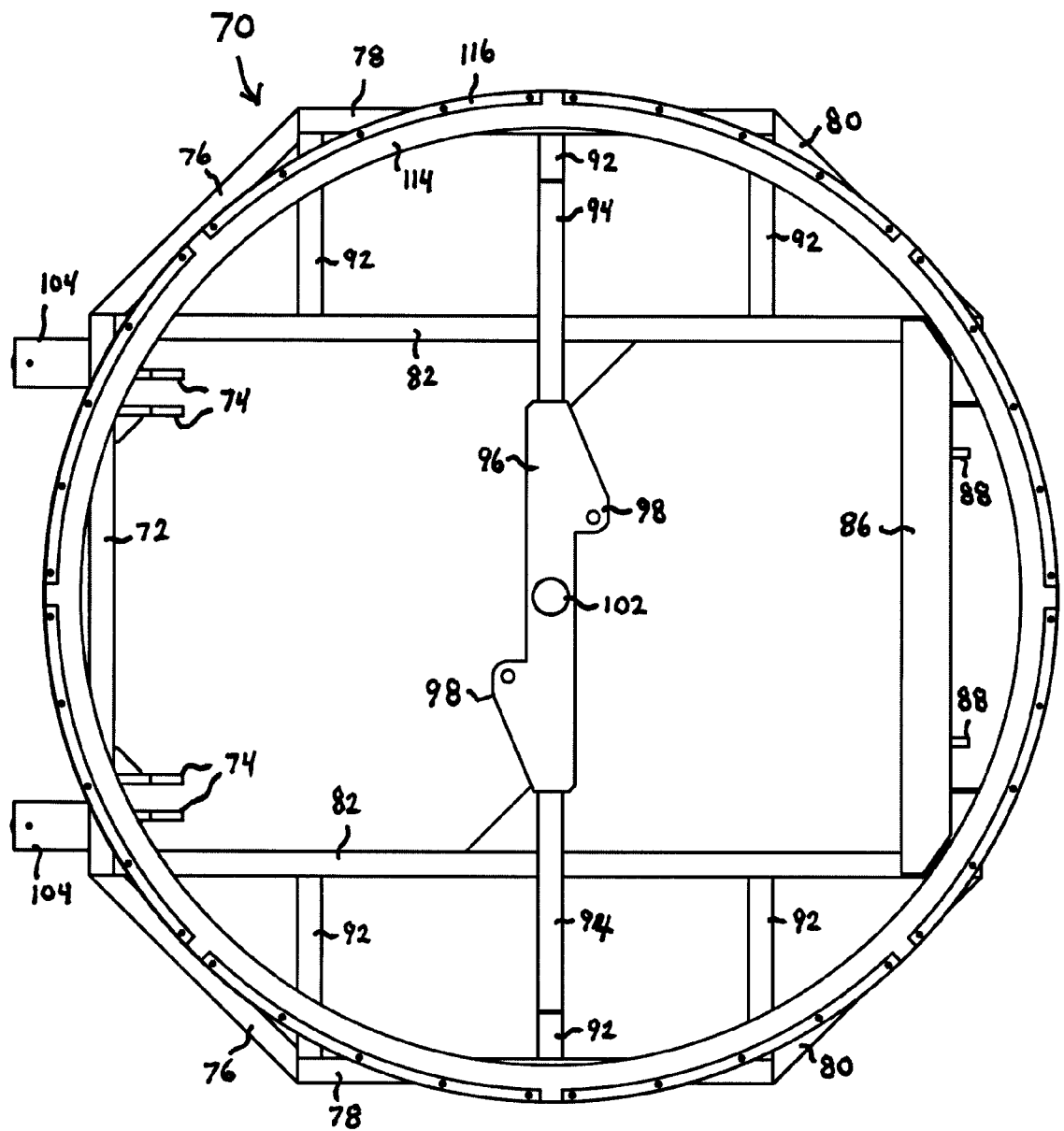
FIG. 14 is a top plan view of the intermediate tilting table frame assembly 70 shown in FIG. 13 (a segmented capture ring 118 is not shown)
Figure 15:
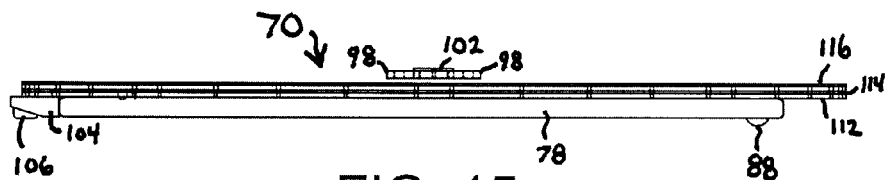
FIG. 15 is a side plan view of the intermediate tilting table frame assembly 70 shown in FIG. 13 (a segmented capture ring 118 is not shown)
Figure 16:
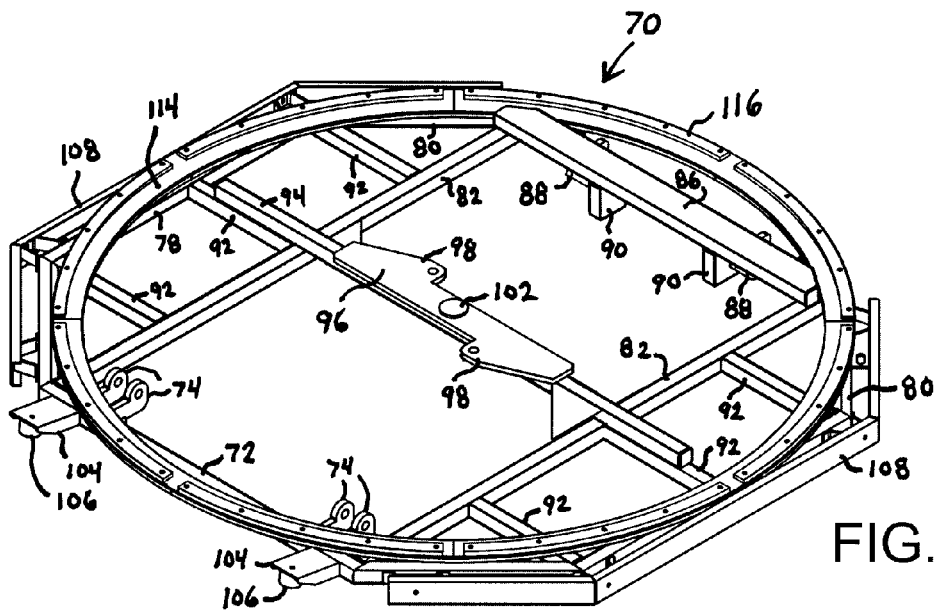
FIG. 16 is a perspective, partially exploded view from the left front quarter from above of the intermediate tilting table frame assembly 70 shown in FIG. 15 (a segmented capture ring 118 is not shown)
Figure 17:
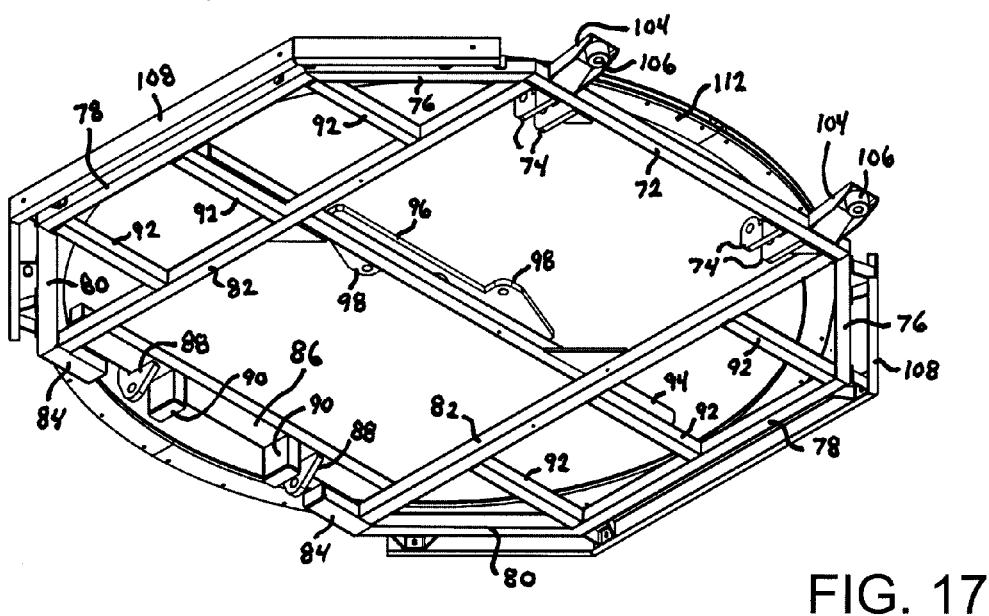
FIG. 17 is a perspective view from the right front quarter from below of the intermediate tilting table frame assembly 70 shown in FIG. 16 (a segmented capture ring 118 is not shown)
Figure 18:
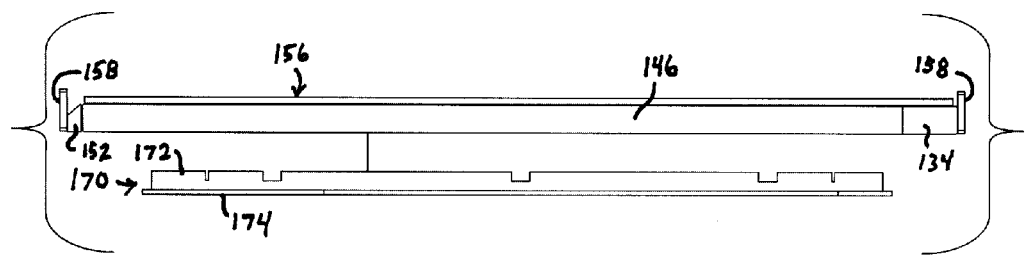
FIG. 18 is a partially exploded side view of an upper rotating table frame assembly 130 of the preferred embodiment.
Figure 19:
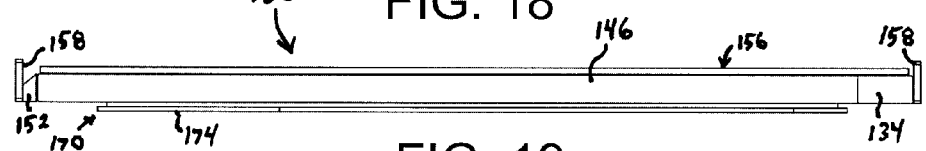
FIG. 19 is a side plan view of the assembled upper rotating table frame assembly 130 shown in FIG. 18.
Figure 20:
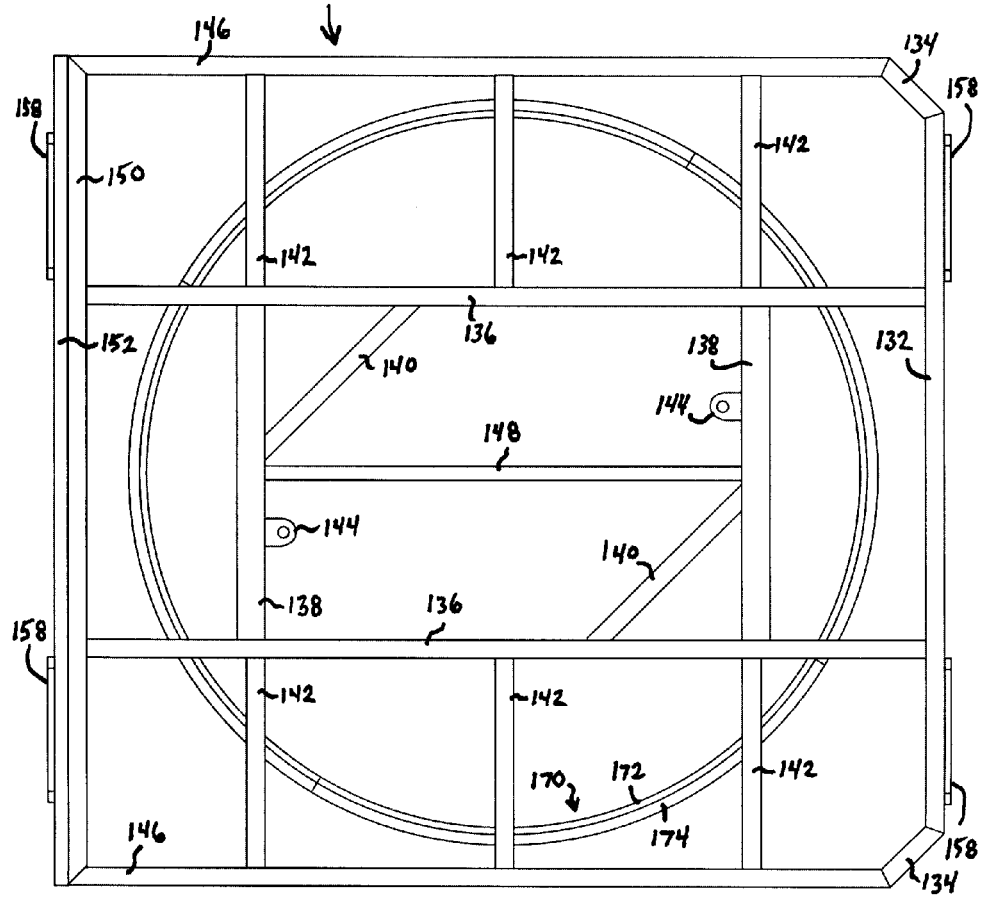
FIG. 20 is a top plan view of the upper rotating table frame assembly 130 shown in FIGS. 18 and 19 (inner central table skin 154 and outer table skins 156 not shown)
Figure 21:
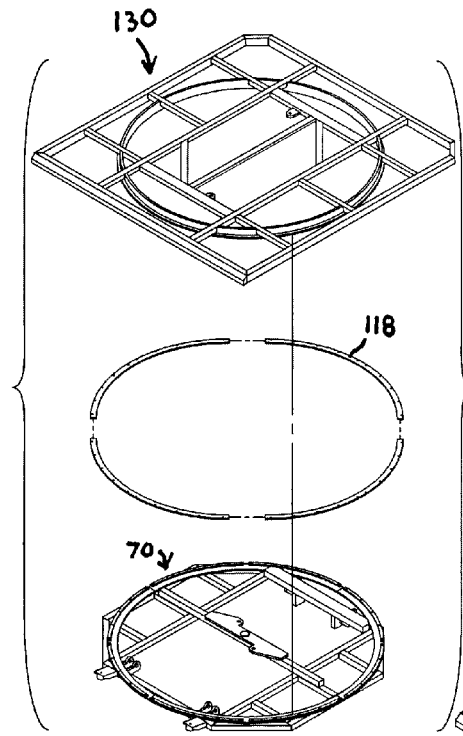
FIG. 21 is a perspective, partially exploded view of the upper rotating table frame assembly 130, the intermediate tilting table frame assembly 70, and a segmented capture ring 118 of the upper rotating table frame assembly (inner central table skin 154 and outer table skins 156 not shown)
Figure 22:
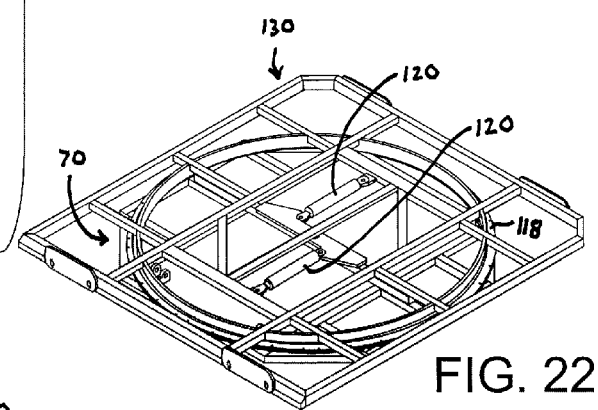
FIG. 22 is a perspective view of the upper rotating table frame assembly 130 rotatably attached to the intermediate tilting table frame assembly 70 by the segmented capture ring 118 shown in FIGS. 21 and 23 (inner central table skin 154 and outer table skins 156 not shown)
Figure 23:
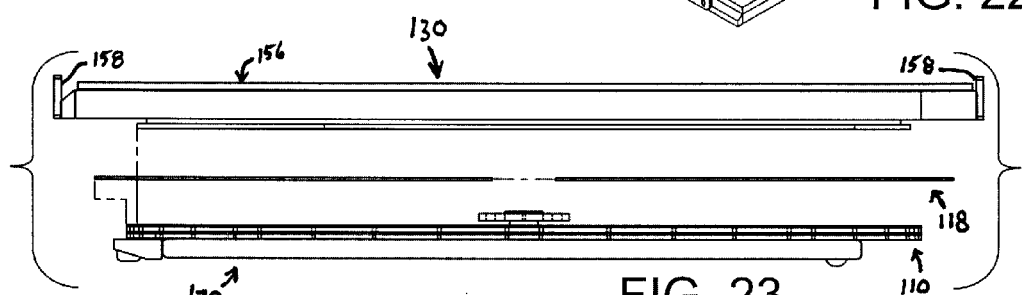
FIG. 23 is a partially exploded side view of the upper rotating table frame assembly 130, the intermediate tilting table frame assembly 70, and a segmented capture ring 118 of the upper rotating table frame assembly shown in FIGS. 21 and 22.
Figure 24:
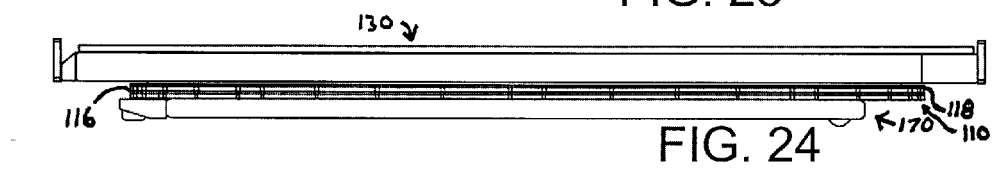
FIG. 24 is a side view of the upper rotating table frame assembly 130 rotatably attached to the intermediate tilting table frame assembly 70 also shown in FIG. 22.
Figure 25:
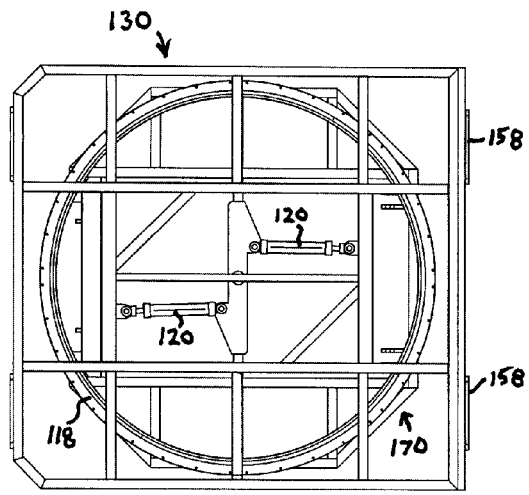
FIG. 25 is a top plan view of the upper rotating table frame assembly 130 rotatably attached to the intermediate tilting table frame assembly 70 by the segmented capture ring 118 shown in FIGS. 21 and 23 and by two upper rotating frame assembly rotation actuators 120 (inner central table skin 154 and outer table skins 156 not shown)
Figure 26:
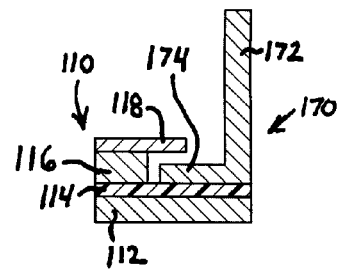
FIG. 26 is a cross-sectional view showing the physical relationships between inner perimeters of four rings of a preferred embodiment of a four-ring fixed ring assembly 110 and outer perimeters of two rings of a rotating ring assembly 170, said four-ring fixed ring assembly comprising a base ring 112 attached to and beneath, an ultrahigh molecular weight (UHMW) plastic ring 114 attached to and beneath, a segmented spacer ring 116 attached to and beneath, a segmented capture ring 118, said rotating ring assembly comprising an attachment ring 172 attached to an inner perimeter of a slider ring 174, and the outer perimeter of said slider ring slidingly captured and retained in the annular space between said plastic ring and said partially overlapping capture ring.
Figure 27:
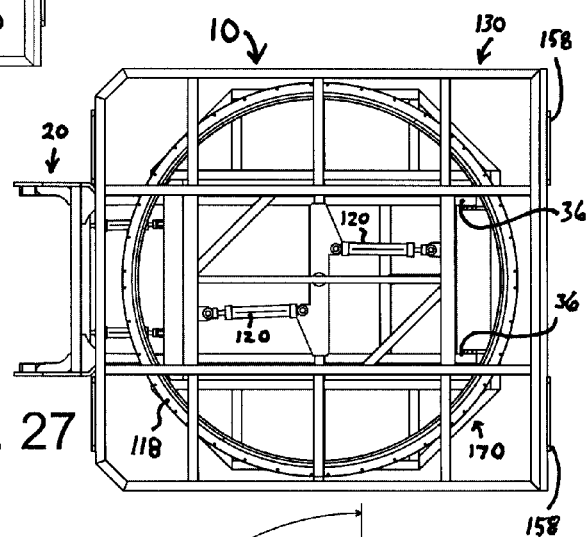
FIG. 27 is a top plan view of the upper rotating table frame assembly 130 rotatably attached to the intermediate tilting table frame assembly 70 and the intermediate tilting table frame assembly pivotally attached to the upper rails 36 of the lower pivot frame assembly 20 (main pivot bolts, table lifting actuator lower mounting ear, table lifting actuator, booster strut mount, booster strut, booster strut actuator, outer table skin and inner central table skin not shown)
Figure 28:
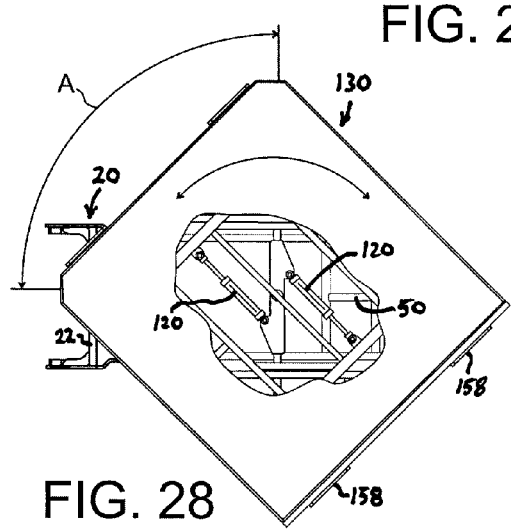
FIG. 28 is a partially cutaway top plan view of the upper rotating table frame assembly 130 rotatably attached to the intermediate tilting table frame assembly 70 and rotated approximately 45 degrees along an indicated 90 degree arc A from an initial parked position (a fore and aft orientation of the longitudinal axis of the table to the longitudinal axis of the vehicle) and the intermediate tilting table frame assembly pivotally attached to the upper rails 36 of the lower pivot frame assembly 20 (main pivot pin, table lifting actuator lower mounting ear, table lifting actuator, booster strut mount, booster strut, booster strut actuator, outer table skin and inner table skin not shown)
Figure 29:
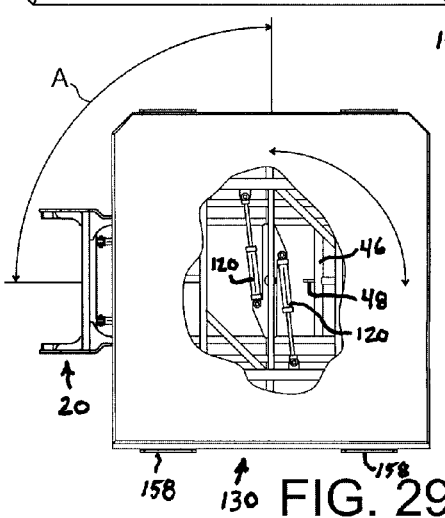
FIG. 29 is a partially cutaway top plan view of the upper rotating table frame assembly 130 rotatably attached to the intermediate tilting table frame assembly 70 and rotated approximately 90 degrees from an initial fore and aft orientation and the intermediate tilting table frame assembly pivotally attached to the lower pivot frame assembly 20 and showing an arc of rotation A of the upper rotating table frame assembly of about 90 degrees (main pivot bolts, table lifting actuator lower mounting ear, table lifting actuator, booster strut mount, booster strut, booster strut actuator, outer table skin and inner table skin not shown)
Figure 39:
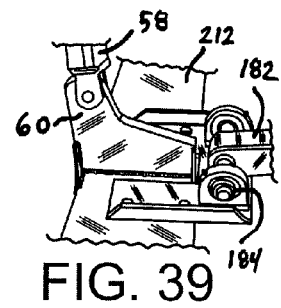
FIG. 39 is a partial perspective view of a booster strut mount 184 attached by bolts and nuts to a cross-frame member 212 of the vehicle and pivotally attached to a booster strut 182.
Figure 35:
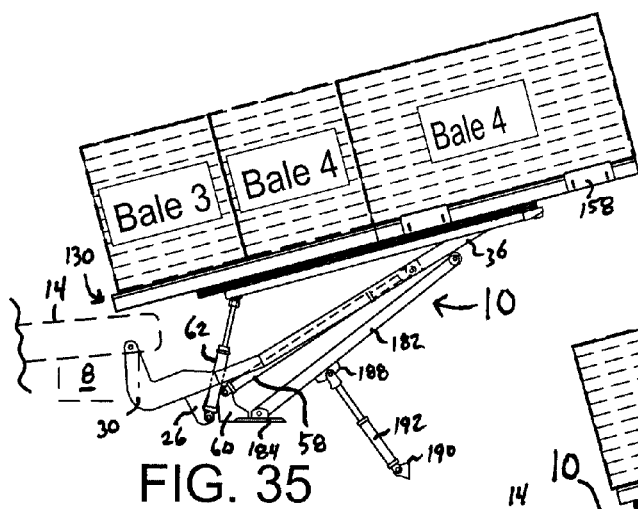
FIG. 35 is a side plan view of the rearward-hinged and forward-hinged, rotatable and tiltable receiving table 10 in a partially elevated tilted position and pivotally attached to a transport vehicle 8 and showing the upper rotating table frame assembly 130 rotated approximately 45 degrees from fore and aft and rotatably attached to the intermediate tilting table frame assembly 70 and the intermediate tilting table frame assembly pivotally attached to the upper rails 36 of the lower pivot frame assembly 20 and showing the bale layer of phantom Bale 3 and Bale 4 shown in FIG. 34.
Figure 36:
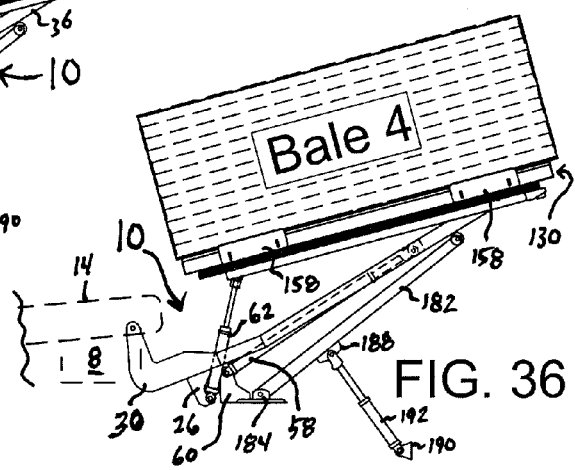
FIG. 36 is a side plan view of the rearward-hinged and forward-hinged, rotatable and tiltable receiving table 10 in a partially elevated tilted position and pivotally attached to a transport vehicle 8 and showing the upper rotating table frame assembly 130 rotated 90 degrees to the longitudinal axis of the vehicle and of the rear-hinged load table 14 and rotatably attached to the intermediate tilting table frame assembly 70 and the intermediate tilting table frame assembly pivotally attached to the upper rails 36 of the lower pivot frame assembly 20 and showing the layer of phantom Bale 3 (behind Bale 4) and Bale 4 shown in FIGS. 34 and 35.
Figure 37:
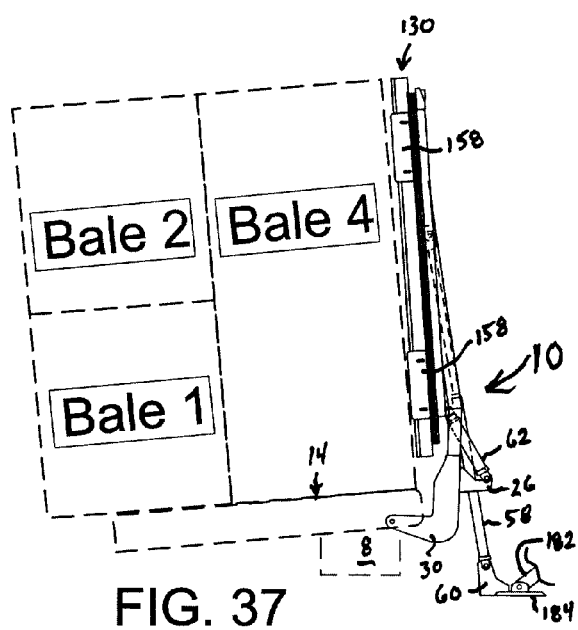
FIG. 37 is a side plan view of the rearward-hinged and forward-hinged, rotatable and tiltable receiving table 10 in a partially elevated tilted position and pivotally attached to a transport vehicle 8 and showing the upper rotating table frame assembly 130 rotated 90 degrees to the longitudinal axis of the vehicle and of the rear-hinged load table 14 and rotatably attached to the intermediate tilting table frame assembly 70 and the intermediate tilting table frame assembly pivotally attached to the upper rails 36 of the lower pivot frame assembly 20 and showing the layer of phantom Bale 3 (behind Bale 4) and Bale 4 after their deposit on the load table 14.
Figure 38:
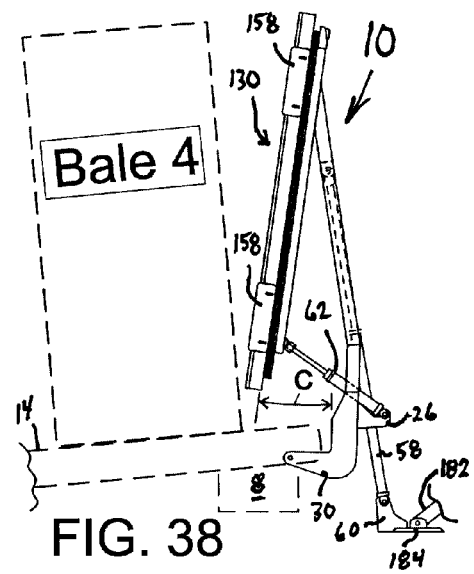
FIG. 38 is a side plan view of the rearward-hinged and forward-hinged, rotatable and tiltable receiving table 10 in a partially elevated tilted position and pivotally attached to a transport vehicle 8 and showing the upper rotating table frame assembly 130 rotated 90 degrees to the longitudinal axis of the vehicle and of the rear-hinged load table 14 and rotatably attached to the intermediate tilting table frame assembly 70 and the intermediate tilting table frame assembly pivotally attached to the upper rails 36 of the lower pivot frame assembly 20 and showing the bale layer of phantom Bale 3 (behind Bale 4) and Bale 4 after their deposit on and a lateral shift of their position along the stack load table 14 by the upper rotating table frame assembly.

Referring to FIGS. 1 to 39, the present invention is a novel rearward-hinged and forward-hinged, rotatable and tiltable receiving table 10 for a bale transport vehicle 8. A method of using the rearward-hinged and forward-hinged, rotatable and tiltable receiving table 10 provides for lifting, selectively tilting, selectively rotating, and depositing a layer of bales from the receiving table on to a rear-hinged stack load table 14 of said vehicle. The rearward-hinged and forward-hinged, rotatable and tiltable receiving table 10 in its preferred embodiment replaces a previously mounted non-rotatable, non-tiltable bale receiving table of the transport vehicle.

The elements of the invention, a rearward-hinged and forward-hinged, rotatable and tiltable receiving table 10 preferably for mounting on a bale transport vehicle 8 preferably previously equipped or concurrently being equipped with a Mil-Stak® bale loader 12 and having a rear-hinged stack load table 14 comprise:

A. a lower pivot frame assembly 20 comprising:
preferably two main pivot bolts 42 and two pairs of retaining jam nuts 44,
a main cross rail 22, preferably joined lengthwise and alongside to a cross tilt tube rail 24 having two lower table tilt actuator mounting ears 26 distributed along, attached to, and accessible below said cross tilt tube rail,
two main cross rail pivot plates 28 and 30 or 28' and 30' each plate having a pivot plate pivot hole 32 and preferably joined to the ends of said main cross rail and said cross tilt tube rail,
two spaced frame lower rails 34 joined to said cross rail pivot plates,
two spaced frame upper rails 36 each upper rail joined respectively to one of said lower rails and said joined rails preferably reinforced by adjacent two rail reinforcement plates 38 attached respective over the joint line between the upper and lower rails,
two tilting frame pivot sleeves 40 mounted coaxial one to one to the other and each sleeve respectively located towards the distal ends of respective said upper rails farther away from said lower rail and each pivot sleeve having a cooperating rail pivot pin with a retaining clip for insertion into and retention within said pivot sleeve,
two spaced front cross rails 46 joined between and to said upper rails towards the distal ends of the upper rails away from said cross tilt tube rail,
a table lifting actuator upper mounting ear 48 joined to said front cross rail closer to said cross tilt tube rail,
a booster strut wheel track tube 50 joined between and to said front cross rails parallel and spaced between said upper rails,
two tube to plate T-gussets 52 or 52' each joined respectively to one of said lower rails and to an adjacent portion of said cross tilt tube rail and to an adjacent portion of said main cross rail pivot plate,
two upper main pivot plate gussets 54 each joined respectively to and adjacent to one of said cross rail pivot plates and to an adjacent portion of said main cross rail,
two lower main pivot plate gussets 56 or 56' each joined respectively to and adjacent to one of said cross rail pivot plates and to an adjacent portion of said main cross rail,
a table lifting actuator 58 rotatably connected between and to,
a table lifting actuator lower mounting ear 60 (an element of original bale wagon structure) and said table lifting actuator upper mounting ear 48, and
two tilting actuators 62 each tilting actuator rotatably and respectively connected between and to one of said lower table tilt actuator mounting ears and one of two upper tilting actuator mounting ears 88;

B. an intermediate tilting frame assembly 70 comprising:
a front cross tube 72,
two pairs of intermediate frame pivot plates 74 distributed along a back surface and towards the ends of said front cross tube, said two of intermediate frame pivot plates respectively are pivotally attached to respective said upper rails 36),
two front diagonal corner support tubes 76 each respectively joined to an opposite end of said front cross tube,
two spaced and opposite outer table side support tubes 78 each respectively joined to one of said front diagonal corner support tubes,
two rear diagonal corner support tubes 80 each respectively joined to one of said side support tubes,
two spaced inner table support tubes 82 joined between and to said front cross tube and said rear diagonal corner support tubes,
two coaxial interior rear cross stubs 84 each stub joined respectively to one of said inner table support tubes and depending towards the other said cross stub,
a rear tilt cross tube 86 joined between and to said inner table support tubes and spaced from said front cross tube,
two upper tilting actuator mounting ears 88 distributed along, attached to, and accessible below said rear tilt cross tube,
two park position (rest position) support stubs 90,
a plurality of (preferably six with three to each side of the frame) interior side cross support tubes 92 distributed and joined between and to said outer table side support tubes and said inner table support tubes,
a central cross central actuator mounting plate support tube 94 joined between and to said inner table support tubes and located and spaced about mid-way between said front cross tube and said rear tilt cross tube,
a table rotation central actuator mounting plate 96 having two rotation actuator mounting plate ears 98 joined to said mounting plate support tube and spaced between said inner table support tubes, said central actuator mounting plate having a central transverse bore 100 in the mounting plate top surface sized to receive and retain a protruding low friction material plug 102 inserted in said transverse bore, two bumper pad brackets 104 spaced and attached to the outside front surface of said front cross tube 72 and depending outward from said front cross tube and each said bracket having a respective bumper pad 106 attached to a lower surface of said bracket, and two intermediate tilting frame assembly side shields 108 respectively attached to outside side surfaces of said outer table side support tubes 78, a preferably circular planar fixed ring assembly 110 centered about said central actuator mounting plate and joined to upper generally coplanar surfaces of the rest of said intermediate tilting table frame assembly and said fixed planar ring assembly preferably having four rings each said ring attached coaxially to the next said ring preferably by a plurality of nuts and bolts, said four rings being a base ring 112 attached to and beneath, an ultrahigh molecular weight (UHMW) plastic ring 114 attached to and beneath, a segmented spacer ring 116 attached to and beneath, a segmented capture ring 118, and two rotation actuators 120 each respectively attached to one of said rotation actuator mounting plate ears and one of two rotation actuator mounting ears 144;

C. an upper rotating frame assembly 130 comprising:

a rear cross rail 132, two rear diagonal corner rails 134 each rear diagonal corner rail respectively joined to an opposite end of said rear cross rail, two spaced and opposite central main upper frame rails 136 joined to said rear cross rail preferably in the same plane as said rear diagonal corner rails, two spaced and opposite central table top cross support tubes 138 joined between and to said central main upper frame rails, two spaced diagonally opposite diagonal support tubes 140 joined respectively between and to adjacent said top cross tube and adjacent said central main upper frame rail, a plurality of (preferably six with three respectively to each said central main upper frame rails) table cross support tubes 142 distributed and joined between and to two spaced side rails 146 and said central main upper frame rails, two diametrically opposite table rotation actuator mounting ears 144 each respectively attached to one of said central table top cross support tubes, two spaced and opposite side rails 146 each respectively joined to one of said rear diagonal corner rails, a central skin support tube 148 spaced between said central main upper frame rails and joined between and to said central table top cross support tubes, a front cross rail 150 spaced from said rear cross rail and joined to ends of said central main upper frame rails and said side rails away from said rear cross rail, a receiving table nose 152 preferably joined lengthwise and alongside said front cross rail and furthest away from said rear cross rail, a generally planar central skin 154 joined to adjacent centrally located upper and generally coplanar surfaces of said rails and tubes of said upper rotating frame assembly, two generally planar outer skins 156 joined to adjacent centrally located upper and generally coplanar surfaces of said rails and tubes of said upper rotating frame assembly, a plurality of adjustable table end bale stops 158 distributed along the outer lateral sides of said rear cross rail and said receiving table nose and adjustably attached, a plurality of adjustable table side bale stops 160 and a plurality of bale guide ridges 162 attached to outer surfaces of said side rails and said skins, a generally planar circular rotating ring assembly 170 joined to adjacent lower surfaces of said rails and tubes of said upper rotating frame assembly and said rotating ring assembly having an attachment ring 172 in a plane parallel to and below said central skin support tube and centered about a rectangle defined by said central main upper frame rails and said central table top cross support tubes and a planar slider ring 174 joined coaxially to said attachment ring and depending outwardly from the bottom edge of said attachment ring in a plane generally parallel to said skins; and preferably D. a booster strut assembly 180 comprising:

a booster strut 182 rotatably attached to said bale transport vehicle generally along the longitudinal axis of said vehicle to a booster strut mount 184, said booster strut having a distal rotatable booster strut wheel 186 located at the distal end of said strut, an upper booster strut actuator mounting ear 188 located on a lower surface of said strut between said strut mount and said strut wheel, a lower booster strut actuator mounting ear 190 attached to said vehicle, and a booster strut actuator 192 attached between said strut actuator mounting ears.

The actuators of the invention are powered by a hydraulic system of the vehicle and the hydraulic lines are not shown in the figures to allow a clearer viewing of the structural elements of the invention. A majority of the structural components of the invention are preferably made from sheet steel stock, round or square steel tubing stock, or suitable materials used in making the preexisting receiving table. Means of joining of elements of the invention one to another preferably may include welding. The UHMW ring is a high strength, durable plastic material that provides a slippery surface on which the slider ring may slide coaxially.

Preferably, the invention includes a UHMW ring 114, but the table could be built without said UHMW ring.

From the preceding, it should be apparent that the present invention provides a new rearward-hinged and forward-hinged, rotatable and tiltable receiving table and methods that allow for convenient, easy modification of a bale transport vehicle to permit the lifting, tilting, rotating, and depositing of a layer of bales from the receiving table to a rear-hinged stack load table of a bale transport vehicle.

The fixed ring assembly 110 has a plurality of coaxial cooperating transverse bores distributed along the outer perimeter of said sandwiched rings with the base ring 112 in a generally horizontal plane when the receiving table in an a parked at rest position, a plurality of bolts and nuts or threaded receiving bores in the rings allow the rings to be attached together coaxially along their outer perimeters to slidingly capture the slider ring 174 of the rotating ring assembly 170. The low friction surface ring 114 (preferably is made of a low friction UHMW plastic or other suitable material) and is parallel to and generally congruent to and overlaying said base ring 112. The segmented spacer ring 116 has a plurality of preferably arc-shaped spacer segments and the segmented capture ring 118 has a plurality of preferably arc-shaped capture segments.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

We claim:

1. A rearward-hinged and forward-hinged, rotatable and tiltable receiving table 10 preferably for mounting on a bale transport vehicle 8 preferably previously equipped or concurrently being equipped with a Mil-Stak® bale loader 12 and having a rear-hinged stack load table 14 comprising:
  A. a lower pivot frame assembly 20 comprising:
    preferably two main pivot bolts 42 and two pairs of retaining jam nuts 44,
    a main cross rail 22, preferably joined lengthwise and alongside to
    a cross tilt tube rail 24 having two lower table tilt actuator mounting ears 26 distributed along, attached to, and accessible below said cross tilt tube rail,
    two main cross rail pivot plates 28 and 30 or 28' and 30' each plate having a pivot plate pivot hole 32 and preferably joined to the ends of said main cross rail and said cross tilt tube rail,
    two spaced frame lower rails 34 joined to said cross rail pivot plates,
    two spaced frame upper rails 36 each upper rail joined respectively to one of said lower rails and said joined rails preferably reinforced by adjacent two rail reinforcement plates 38 attached respective over the joint line between the upper and lower rails,
    two tilting frame pivot sleeves 40 mounted coaxial one to one to the other and each sleeve respectively located towards the distal ends of respective said upper rails farther away from said lower rail and each pivot sleeve having a cooperating rail pivot pin with a retaining clip for insertion into and retention within said pivot sleeve,
    two spaced front cross rails 46 joined between and to said upper rails towards the distal ends of the upper rails away from said cross tilt tube rail,
    a table lifting actuator upper mounting ear 48 joined to said front cross rail closer to said cross tilt tube rail,
    a booster strut wheel track tube 50 joined between and to said front cross rails parallel and spaced between said upper rails,
    two tube to plate T-gussets 52 or 52' each joined respectively to one of said lower rails and to an adjacent portion of said cross tilt tube rail and to an adjacent portion of said main cross rail pivot plate,
    two upper main pivot plate gussets 54 each joined respectively to and adjacent to one of said cross rail pivot plates and to an adjacent portion of said main cross rail,
    two lower main pivot plate gussets 56 or 56' each joined respectively to and adjacent to one of said cross rail pivot plates and to an adjacent portion of said main cross rail, a table lifting actuator 58 rotatably connected between and to,
    a table lifting actuator lower mounting ear 60 (an element of original bale wagon structure) and said table lifting actuator upper mounting ear 48, and
    two tilting actuators 62 each tilting actuator rotatably and respectively connected between and to one of said lower table tilt actuator mounting ears and one of two upper tilting actuator mounting ears 88;
  B. an intermediate tilting frame assembly 70 comprising:
    a front cross tube 72,
    two pairs of intermediate frame pivot plates 74 distributed along a back surface and towards the ends of said front cross tube, said two of intermediate frame pivot plates respectively are pivotally attached to respective said upper rails 36,
    two front diagonal corner support tubes 76 each respectively joined to an opposite end of said front cross tube,
    two spaced and opposite outer table side support tubes 78 each respectively joined to one of said front diagonal corner support tubes,
    two rear diagonal corner support tubes 80 each respectively joined to one of said side support tubes,
    two spaced inner table support tubes 82 joined between and to said front cross tube and said rear diagonal corner support tubes,
    two coaxial interior rear cross stubs 84 each stub joined respectively to one of said inner table support tubes and depending towards the other said cross stub,
    a rear tilt cross tube 86 joined between and to said inner table support tubes and spaced from said front cross tube,
    two upper tilting actuator mounting ears 88 distributed along, attached to, and accessible below said rear tilt cross tube,
    two park position (rest position) support stubs 90,
    a plurality of (preferably six with three to each side of the frame) interior side cross support tubes 92 distributed and joined between and to said outer table side support tubes and said inner table support tubes,
    a central cross central actuator mounting plate support tube 94 joined between and to said inner table support tubes and located and spaced about mid-way between said front cross tube and said rear tilt cross tube,
    a table rotation central actuator mounting plate 96 having two rotation actuator mounting plate ears 98 joined to said mounting plate support tube and spaced between said inner table support tubes, said central actuator mounting plate having a central transverse bore 100 in the mounting plate top surface sized to receive and retain a protruding low friction material plug 102 inserted in said transverse bore,
    two bumper pad brackets 104 spaced and attached to the outside front surface of said front cross tube 72 and depending outward from said front cross tube and each said bracket having a respective bumper pad 106 attached to a lower surface of said bracket, and
    two intermediate tilting frame assembly side shields 108 respectively attached to outside side surfaces of said outer table side support tubes 78,
    a preferably circular planar fixed ring assembly 110 centered about said central actuator mounting plate and joined to upper generally coplanar surfaces of the rest of said intermediate tilting table frame assembly and said fixed planar ring assembly preferably having four rings each said ring attached coaxially to the next said ring preferably by a plurality of nuts and bolts, said four rings being a base ring 112 attached to and beneath, an ultrahigh molecular weight (UHMW) plastic ring 114 attached to and beneath, a segmented spacer ring 116 attached to and beneath, a segmented capture ring 118, and two rotation actuators 120 each respectively attached to one of said rotation actuator mounting plate ears and one of two rotation actuator mounting ears 144;

C. an upper rotating frame assembly 130 comprising:
  a rear cross rail 132,
  two rear diagonal corner rails 134 each rear diagonal corner rail respectively joined to an opposite end of said rear cross rail,
  two spaced and opposite central main upper frame rails 136 joined to said rear cross rail preferably in the same plane as said rear diagonal corner rails,
  two spaced and opposite central table top cross support tubes 138 joined between and to said central main upper frame rails,
  two spaced diagonally opposite diagonal support tubes 140 joined respectively between and to adjacent said top cross tube and adjacent said central main upper frame rail,
  a plurality of (preferably six with three respectively to each said central main upper frame rails) table cross support tubes 142 distributed and joined between and to two spaced side rails 146 and said central main upper frame rails,
  two diametrically opposite table rotation actuator mounting ears 144 each respectively attached to one of said central table top cross support tubes,
  two spaced and opposite side rails 146 each respectively joined to one of said rear diagonal corner rails,
  a central skin support tube 148 spaced between said central main upper frame rails and joined between and to said central table top cross support tubes,
  a front cross rail 150 spaced from said rear cross rail and joined to ends of said central main upper frame rails and said side rails away from said rear cross rail,
  a receiving table nose 152 preferably joined lengthwise and alongside said front cross rail and furthest away from said rear cross rail,
  a generally planar central skin 154 joined to adjacent centrally located upper and generally coplanar surfaces of said rails and tubes of said upper rotating frame assembly,
  two generally planar outer skins 156 joined to adjacent centrally located upper and generally coplanar surfaces of said rails and tubes of said upper rotating frame assembly,
  a plurality of adjustable table end bale stops 158 distributed along the outer lateral sides of said rear cross rail and said receiving table nose and adjustably attached,
  a plurality of adjustable table side bale stops 160 and a plurality of bale guide ridges 162 attached to outer surfaces of said side rails and said skins,
  a generally planar circular rotating ring assembly 170 joined to adjacent lower surfaces of said rails and tubes of said upper rotating frame assembly and said rotating ring assembly having
    an attachment ring 172 in a plane parallel to and below said central skin support tube and centered about a rectangle defined by said central main upper frame rails and said central table top cross support tubes and
    a planar slider ring 174 joined coaxially to said attachment ring and depending outwardly from the bottom edge of said attachment ring in a plane generally parallel to said skins; and preferably D. a booster strut assembly 180 comprising:
  a booster strut 182 rotatably attached to said bale transport vehicle generally along the longitudinal axis of said vehicle to a booster strut mount 184, said booster strut having a distal rotatable booster strut wheel 186 located at the distal end of said strut,
  an upper booster strut actuator mounting ear 188 located on a lower surface of said strut between said strut mount and said strut wheel,
  a lower booster strut actuator mounting ear 190 attached to said vehicle, and
  a booster strut actuator 192 attached between said strut actuator mounting ears.

2. A rearward-hinged and forward-hinged, rotatable and tiltable receiving table for mounting on a bale transport vehicle having a rear-hinged stack load table comprising:

A. a lower pivot frame assembly comprising:
  two main pivot bolts and a plurality of retaining jam nuts,
  a main cross rail, joined lengthwise and alongside to
  a cross tilt tube rail having two lower table tilt actuator mounting ears distributed along, attached to, and accessible below said cross tilt tube rail,
  two main cross rail pivot plates each plate having a pivot plate pivot hole and joined to the ends of said main cross rail and said cross tilt tube rail,
  two spaced frame lower rails joined to said cross rail pivot plates,
  two spaced frame upper rails each upper rail joined respectively to one of said lower rails,
  two tilting frame pivot sleeves mounted coaxial one to the other and each sleeve respectively located towards the distal ends of respective said upper rails farther away from said lower rail and each pivot sleeve having a cooperating rail pivot pin with a retaining clip for insertion into and retention within said pivot sleeve,
  two spaced front cross rails joined between and to said upper rails towards the distal ends of the upper rails away from said cross tilt tube rail,
  a table lifting actuator upper mounting ear joined to said front cross rail closer to said cross tilt tube rail,
  a table lifting actuator rotatably connected between and to,
  a table lifting actuator lower mounting ear (an element of original bale wagon structure) and said table lifting actuator upper mounting ear, and
  two tilting actuators each tilting actuator rotatably and respectively connected between and to one of said lower table tilt actuator mounting ears and one of two upper tilting actuator mounting ears;

B. an intermediate tilting frame assembly comprising:
  a front cross tube,
  two pairs of intermediate frame pivot plates distributed along a back surface and towards the ends of said front cross tube, said two pairs of intermediate frame pivot plates respectively are pivotally attached to respective said upper rails,
  two front diagonal corner support tubes each respectively joined to an opposite end of said front cross tube,
  two spaced and opposite outer table side support tubes each respectively joined to one of said front diagonal corner support tubes, two rear diagonal corner support tubes each respectively joined to one of said side support tubes, two spaced inner table support tubes joined between and to said front cross tube and said rear diagonal corner support tubes, two coaxial interior rear cross stubs each stub joined respectively to one of said inner table support tubes and depending towards the other said cross stub, a rear tilt cross tube joined between and to said inner table support tubes and spaced from said front cross tube, two upper tilting actuator mounting ears distributed along, attached to, and accessible below said rear tilt cross tube, a plurality of interior side cross support tubes distributed and joined between and to said outer table side support tubes and said inner table support tubes, a central cross central actuator mounting plate support tube joined between and to said inner table support tubes and located and spaced about mid-way between said front cross tube and said rear tilt cross tube, a table rotation central actuator mounting plate having two rotation actuator mounting plate ears joined to said mounting plate support tube and spaced between said inner table support tubes, a preferably circular planar fixed ring assembly centered about said central actuator mounting plate and joined to upper generally coplanar surfaces of the rest of said intermediate tilting table frame assembly and said fixed planar ring assembly preferably having four rings each said ring attached coaxially to the next said ring preferably by a plurality of nuts and bolts, said four rings being a base ring attached to and beneath, an ultrahigh molecular weight (UHMW) plastic ring attached to and beneath, a segmented spacer ring attached to and beneath, a segmented capture ring, and two rotation actuators each respectively attached to one of said rotation actuator mounting plate ears and one of two rotation actuator mounting ears;

C. an upper rotating frame assembly comprising:

a rear cross rail, two rear diagonal corner rails each rear diagonal corner rail respectively joined to an opposite end of said rear cross rail, two spaced and opposite central main upper frame rails joined to said rear cross rail preferably in the same plane as said rear diagonal corner rails, two spaced and opposite central table top cross support tubes joined between and to said central main upper frame rails, two spaced diagonally opposite diagonal support tubes joined respectively between and to adjacent said top cross tube and adjacent said central main upper frame rail, a plurality of table cross support tubes distributed and joined between and to two spaced side rails and said central main upper frame rails, two diametrically opposite table rotation actuator mounting ears each respectively attached to one of said central table top cross support tubes, two spaced and opposite side rails each respectively joined to one of said rear diagonal corner rails, a front cross rail spaced from said rear cross rail and joined to ends of said central main upper frame rails and said side rails away from said rear cross rail, a receiving table nose preferably joined lengthwise and alongside said front cross rail and furthest away from said rear cross rail, a generally planar central skin joined to adjacent centrally located upper and generally coplanar surfaces of said rails and tubes of said upper rotating frame assembly, two generally planar outer skins joined to adjacent centrally located upper and generally coplanar surfaces of said rails and tubes of said upper rotating frame assembly, a plurality of adjustable table end bale stops distributed along the outer lateral sides of said rear cross rail and said receiving table nose and adjustably attached, a plurality of adjustable table side bale stops and a plurality of bale guide ridges attached to outer surfaces of said side rails and said skins, a generally planar circular rotating ring assembly joined to adjacent lower surfaces of said rails and tubes of said upper rotating frame assembly and said rotating ring assembly having an attachment ring in a plane parallel to and below said central skin support tube and centered about a rectangle defined by said central main upper frame rails and said central table top cross support tubes and a planar slider ring joined coaxially to said attachment ring and depending outwardly from the bottom edge of said attachment ring in a plane generally parallel to said skins.

3. A rearward-hinged and forward-hinged, rotatable and tiltable receiving table in accordance with claim 2 further comprising a booster strut wheel track tube joined between and to said front cross rails parallel and spaced between said upper rails, and a booster strut assembly comprising:

a booster strut rotatably attached to said bale transport vehicle generally along the longitudinal axis of said vehicle to a booster strut mount, said booster strut having a distal rotatable booster strut wheel located at the distal end of said strut, an upper booster strut actuator mounting ear located on a lower surface of said strut between said strut mount and said strut wheel, a lower booster strut actuator mounting ear attached to said vehicle, and a booster strut actuator attached between said strut actuator mounting ears.

4. A rearward-hinged and forward-hinged, rotatable and tiltable receiving table in accordance with claim 2 wherein said central actuator mounting plate having a central transverse bore in the mounting plate top surface sized to receive and retain a protruding low friction material plug inserted in said transverse bore.

5. A rearward-hinged and forward-hinged, rotatable and tiltable receiving table in accordance with claim 2 further comprising two intermediate tilting frame assembly side shields respectively attached to outside side surfaces of said outer table side support tubes 78.

* * * * *